UNITED STATES PATENT OFFICE.

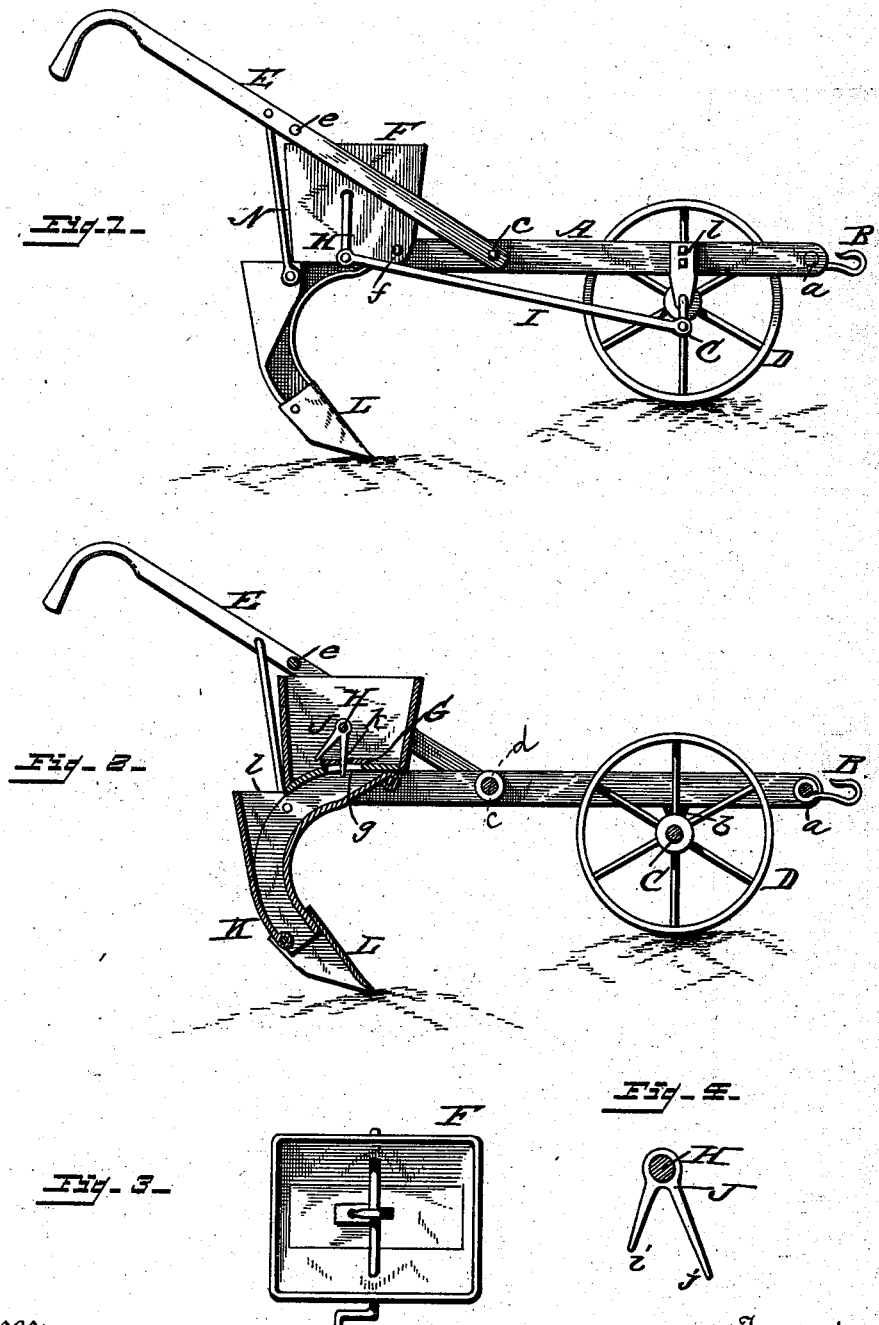

LOUIS TEDDER, OF NEAR ALVORD, TEXAS.

CORN AND COTTON PLANTER.

SPECIFICATION forming part of Letters Patent No. 382,569, dated May 8, 1888.

Application filed February 23, 1888. Serial No. 265,012. (No model.)

*To all whom it may concern:*

Be it known that I, LOUIS TEDDER, a citizen of the United States, residing near Alvord, in the county of Wise and State of Texas, have invented certain new and useful Improvements in Corn and Cotton Planters; and I do hereby declare that the following is a full, clear, and exact description of the same, reference being had to the annexed drawings, making a part of this specification, and to the letters and figures of reference marked thereon.

This invention relates to certain new and useful improvements in corn and cotton planters; and the novelty resides in the peculiar combinations and the construction, arrangement, and adaptation of parts, all as more fully hereinafter described, shown in the drawings, and then particularly pointed out in the claim.

In the accompanying drawings, which form a part of this specification, and in which similar letters of reference indicate like parts throughout the several figures, Figure 1 is a side elevation of a planter constructed in accordance with my invention. Fig. 2 is a central vertical longitudinal section of the same. Fig. 3 is a top plan of the hopper detached, and Fig. 4 is a side view of the agitator detached.

Referring to the drawings by letter, A designates the beam, composed of two parallel bars arranged with a space between them, and connected at the forward end by a pin, $a$, upon which is pivoted the draft-hook B. Secured to the outer faces of the bars forming the beam, near the forward end thereof, are the lugs or ears $b$, in which is journaled the crank-shaft C, upon which is secured the wheel D, which works in the space between the two bars of the beam. To the rear of the said wheel the bars of the beam are connected by the rod $c$, and on this rod between the bars is the sleeve or washer $d$, which serves to keep the bars a regulated distance apart. This rod $c$ serves also to secure the ends of the handles E to the bars, which handles are connected by the rod $e$. To the rear ends of the bars forming the beam I secure the hopper F, the sides of which project downward, as at $f$, and are secured to the sides of the bars. The sides of this hopper are flaring, as shown at Fig. 3, and in the bottom is provided a discharge-opening, $g$, the outflow from which is governed by a slide or valve, G.

H is a crank-shaft journaled in the sides of the hopper, and is connected with the crank-shaft C by means of the pitman I. On the shaft H within the hopper is a stirring-finger or agitator, J, formed with two arms, $i\ j$, the latter of which projects through an opening, $k$, in the slide G, as shown in Fig. 2, and extends for a short distance through the opening in the bottom of the hopper, while the other arm works within the hopper.

Secured to the beam beneath the seed box or hopper is the boot K, to the lower end of which is pivotally secured the plow-blade L. This boot is curved rearward, and to the rear of the hopper is open at the top, as seen at $l$, so that the operator can see the seed as it passes down from the hopper.

M are brace-rods connecting the handles with the boot, as seen in Figs. 1 and 2.

In operation, draft being applied to the draft-hook and the machine drawn forward, the plow opens the furrow, and the revolution of the wheels D, through the medium of the crank-shaft C and pitman I, causes the shaft H to vibrate. The movement of the shaft H rocks the agitator J back and forth, and in each movement of the agitator the slide is moved back and forth, the finger $j$ operating the slide and serving to keep the opening in the bottom of the hopper from becoming clogged, and the finger $i$ serving to agitate the seed in the hopper, and in a measure to clear the way for the slide. The curving of the boot serves to separate any seed that may fall through the opening in the hopper in a mass.

What I claim as new is—

The combination, with the hopper, the wheel, the crank-shaft carrying said wheel, the rock-shaft journaled in said hopper, and the pitman connecting the crank-shaft with the rock-shaft, of a slide within said hopper, and the agitator J, on said rock-shaft, within the hopper, and formed with two arms of different lengths and extending in different vertical planes, the longer arm engaging an opening in the slide and extended through the opening in the bottom of the hopper and the other
5 arm working in the hopper in proximity to the slide, substantially as shown and described, and for the purpose specified.

In testimony that I claim the above I have hereunto subscribed my name in the presence of two witnesses.

LOUIS TEDDER.

Witnesses:
W. F. RICH,
C. C. HAWKINS.